H. H. MAY.
ANIMAL TRAP.
APPLICATION FILED JULY 24, 1912.
1,061,304.
Patented May 13, 1913.
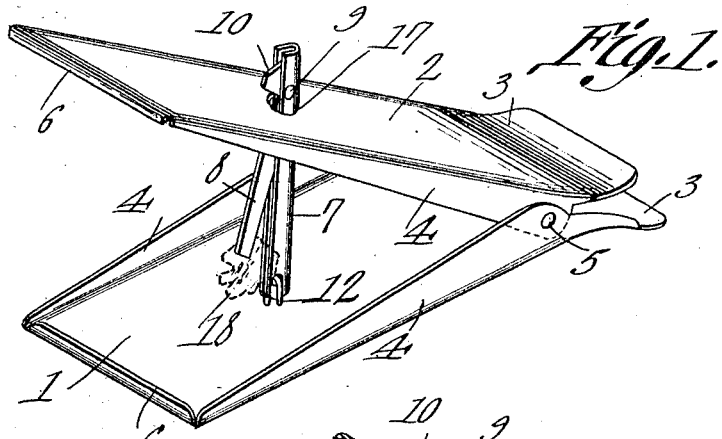
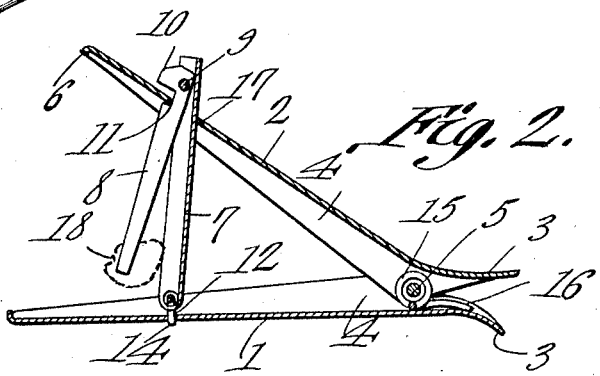
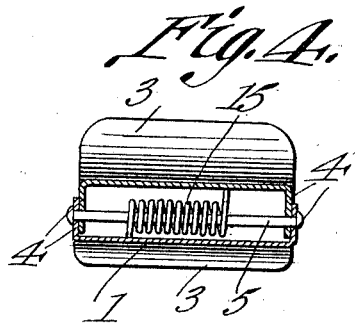
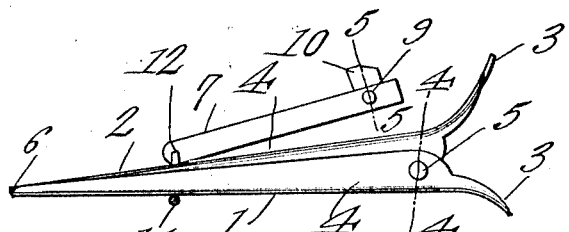
Henry H. May, Inventor
Witnesses
by C. A. Snow & Co., Attorneys

UNITED STATES PATENT OFFICE.

HENRY HEALD MAY, OF NEW ALBION, IOWA.

ANIMAL-TRAP.

1,061,304. Specification of Letters Patent. Patented May 13, 1913.

Application filed July 24, 1912. Serial No. 711,302.

*To all whom it may concern:*

Be it known that I, HENRY H. MAY, a citizen of the United States, residing at New Albion, in the county of Allamakee and State of Iowa, have invented a new and useful Animal-Trap, of which the following is a specification.

One object of the present invention is to provide an animal trap of simple form, the jaws of which are held spaced apart by the bait holder, the construction being such that the mere removal of the bait will serve to permit the jaws to co-act.

A further object of the invention is to provide a trigger mechanism of novel and improved form, and to provide jaws of novel form, with which the trigger mechanism is operatively connected.

A further object of the invention is to provide a trigger mechanism which will grip the bait, so that the bait cannot be removed accidentally, the bait, when gripped, constituting means for holding one element of the trigger mechanism in such a position with respect to one jaw, that the said jaw will be held set.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in perspective; Fig. 2 is a longitudinal section; Fig. 3 is a side elevation, the jaws being closed; Fig. 4 is a section on the line 4—4 of Fig. 3; and Fig. 5 is a section on the line 5—5 of Fig. 3.

In carrying out the invention there is provided a primary jaw 1 and a secondary jaw 2, the jaws 1 and 2 preferably being fashioned from plates of metal. The jaws 1 and 2 terminate at their rear ends in diverging finger pieces 3, whereby the trap may be set manually. Along their longitudinal edges, the jaws 1 and 2 are equipped with overlapped flanges 4, united by a pivot element 5, which may be in the form of a rod. At their forward, operative ends, the jaws 1 and 2 are equipped with projecting lips 6 which overlap, when the jaws are closed together as shown in Fig. 3.

The invention further includes a trigger mechanism comprising a main member 7 and an auxiliary member 8, the members 7 and 8 being united, adjacent their upper ends, by a pivot element 9 as will be understood best when Fig. 5 is examined, the main member 7 of the trigger mechanism being preferably of trough-shaped cross section, while the auxiliary member 8 fits between the walls of the member 7. The auxiliary member 8 of the trigger mechanism is provided adjacent its upper end with a laterally projecting stop 10, below which is formed a laterally projecting shoulder 11, the shoulder 11 being fashioned, ordinarily, by notching the forward edge of the auxiliary member 8. A staple or like connecting element, denoted by the numeral 12, is engaged with the lower end of the main member 7 of the trigger mechanism, to afford a pivotal connection between the member 7 and the primary jaw 1. the ends 14 of the staple 12 being passed through the primary jaw 1, and being clenched upon the lower face of the primary jaw. There is an opening 17 in the secondary jaw 2, through which the members 7 and 8 of the trigger mechanism extend, when the trap is in set condition. The opening 17, however, is of such a diameter that when the secondary jaw is swung upwardly, the stop 10 cannot pass through the opening. Resilient means is provided for forcing the jaws 1 and 2 together, this means ordinarily comprising a helical spring 15 which is engaged around the pivot element 5, the ends 16 of the spring bearing, respectively, against the finger pieces 3 of the jaws 1 and 2, as is common and well understood.

Presupposing that the parts are positioned as shown in Fig. 3, the operation of the device is as follows: The finger pieces 3 are engaged in the hand of the operator, effecting a separation of the jaws 1 and 2 at their forward ends, the spring 15 being put under tension as the jaws 1 and 2 are spaced apart. While the jaws 1 and 2 are being separated, the trigger mechanism 7—8 will move automatically from the inclined position shown in Fig. 3, into the upright position shown in Fig. 1, the trigger mechanism 7—8 passing into the opening 17 in the jaw 2. Ultimately, the stop 10 which constitutes a part of the auxiliary member 8 of the trigger mechanism, will engage with the upper face of the movable jaw 2, the engagement between the stop and the jaw serving to swing the lower end of the auxiliary member 8 outwardly, so that the shoulder 11 engages with the under face of the jaw 2. The parts will thereupon be positioned as shown in Fig. 2, the members 7 and 8 of the trigger mechanism standing in diverging relation. It is to be understood, however, that when the parts are positioned as shown in Fig. 2, the secondary jaw 2 is not locked in set position, until the bait 18 is thrust between and is gripped by the members 7 and 8 of the trigger mechanism.

When the parts are positioned as shown in Fig. 2, the shoulder 11, is not in vertical alinement with the pivot element 9, and consequently, the spring 15 actuating the movable jaw 2, will cause the movable jaw to swing the auxiliary member 8 of the trigger mechanism into alinement with the main member 7, whereupon the jaws will close together.

In order to maintain the trap set, as shown in Fig. 1, it is necessary that the bait 18 be thrust between the diverging members 7 and 8. When the bait is thus positioned, the members 7 and 8 will be prevented from swinging into alinement, and the shoulder 11 will be held beneath the jaw 2, to maintain the jaw open. When the animal seizes the bait 18, the support for the member 8 will be removed, and the members 7 and 8 will pass into alinement, whereupon the shoulder 11 will be disengaged from the jaw 2, and the jaws will close. It is to be noted that the operation of springing the trap does not depend upon the fact that the animal imparts movement to the member 8, the springing of the trap being effected by the mere removal of the bait 18. The bait, therefore, constitutes a means for maintaining the member 8 engaged with the jaw 2, to hold the jaw 2 open, and, at the same time, the members 7 and 8 coöperate to grip the bait 18, so that the bait cannot become dislodged accidentally.

Having thus described the invention what is claimed is:—

1. A trap comprising coöperating jaws; and trigger mechanism comprising diverging, pivotally connected members, between which the bait is gripped, to hold one member engaged with one jaw, when said jaw is set, the other member being slidably held in said jaw and being pivoted to the other jaw.

2. A trap comprising pivotally connected primary and secondary members; and trigger mechanism comprising pivotally connected main and auxiliary members, the main member being pivotally connected with the primary jaw, and the auxiliary member having a shoulder engaging the secondary jaw when the secondary jaw is set, the auxiliary member having a stop engageable by the secondary jaw to position the shoulder for engagement by the secondary jaw, the trigger members diverging, to grip the bait between them, whereby the shoulder will be bait-held in engagement with the secondary jaw.

3. A trap comprising pivotally connected primary and secondary jaws having diverging finger pieces, the secondary jaw having an opening; trigger mechanism comprising a main member and an auxiliary member, pivotally connected, the main member being pivotally united with the primary jaw, the trigger mechanism lying in an inclined position upon the secondary jaw, when the jaws are closed together, the finger pieces constituting means for separating the jaws, whereby the trigger mechanism will assume an upright position and ride automatically into the opening, the auxiliary member of the trigger mechanism having spaced elements, one of which is engageable by the secondary jaw, to swing the other of said elements into engagement with the secondary jaw.

In testimony that I claim the foregoing as my own, I have hereto affixed my signature in the presence of two witnesses.

HENRY HEALD MAY.

Witnesses:
E. JAMES GABLE,
A. F. KUEHN.

Copies of this patent may be obtained for five cents each, by addressing the "Commissioner of Patents, Washington, D. C."